United States Patent [19]

Pechacek

[11] 4,009,798

[45] Mar. 1, 1977

[54] VESSEL CONNECTOR

[75] Inventor: Raymond E. Pechacek, Houston, Tex.

[73] Assignee: Hahn & Clay

[22] Filed: May 7, 1975

[21] Appl. No.: 575,578

[52] U.S. Cl. ............................. 220/325; 220/315; 220/327; 220/354

[51] Int. Cl.² ........................................ B65D 45/16

[58] Field of Search ................. 220/315, 5 A, 81 R, 220/253, 323, 324, 327, 354, 355, 325

[56] References Cited

UNITED STATES PATENTS

| 1,616,288 | 2/1927 | Taliaferro | 220/354 |
|---|---|---|---|
| 3,372,828 | 3/1968 | Pechacek et al. | 220/5 A |
| 3,780,901 | 12/1973 | Pechacek | 220/315 |
| 3,895,735 | 7/1975 | Clay | 220/315 |

*Primary Examiner*—William Price
*Assistant Examiner*—Joseph M. Moy
*Attorney, Agent, or Firm*—Pravel, Wilson & Gambrell

[57] ABSTRACT

A new and improved pin-type vessel connector wherein a first vessel section includes double connector rings separated by an annular recess which receives a single connector ring of a second vessel section, the connector rings being releasably joined by a plurality of pin-type connectors which include radially aligned openings in each of the rings for receiving a tapered pin, one portion of the opening in the single ring connector being partially tapered to provide a full bearing engagement against the tapered pin under load conditions. Positioning elements are mounted with the single connector ring for positioning the single connector ring uniformly within the annular recess between the double rings in spite of changes in the circumference or roundness of the single ring.

15 Claims, 4 Drawing Figures

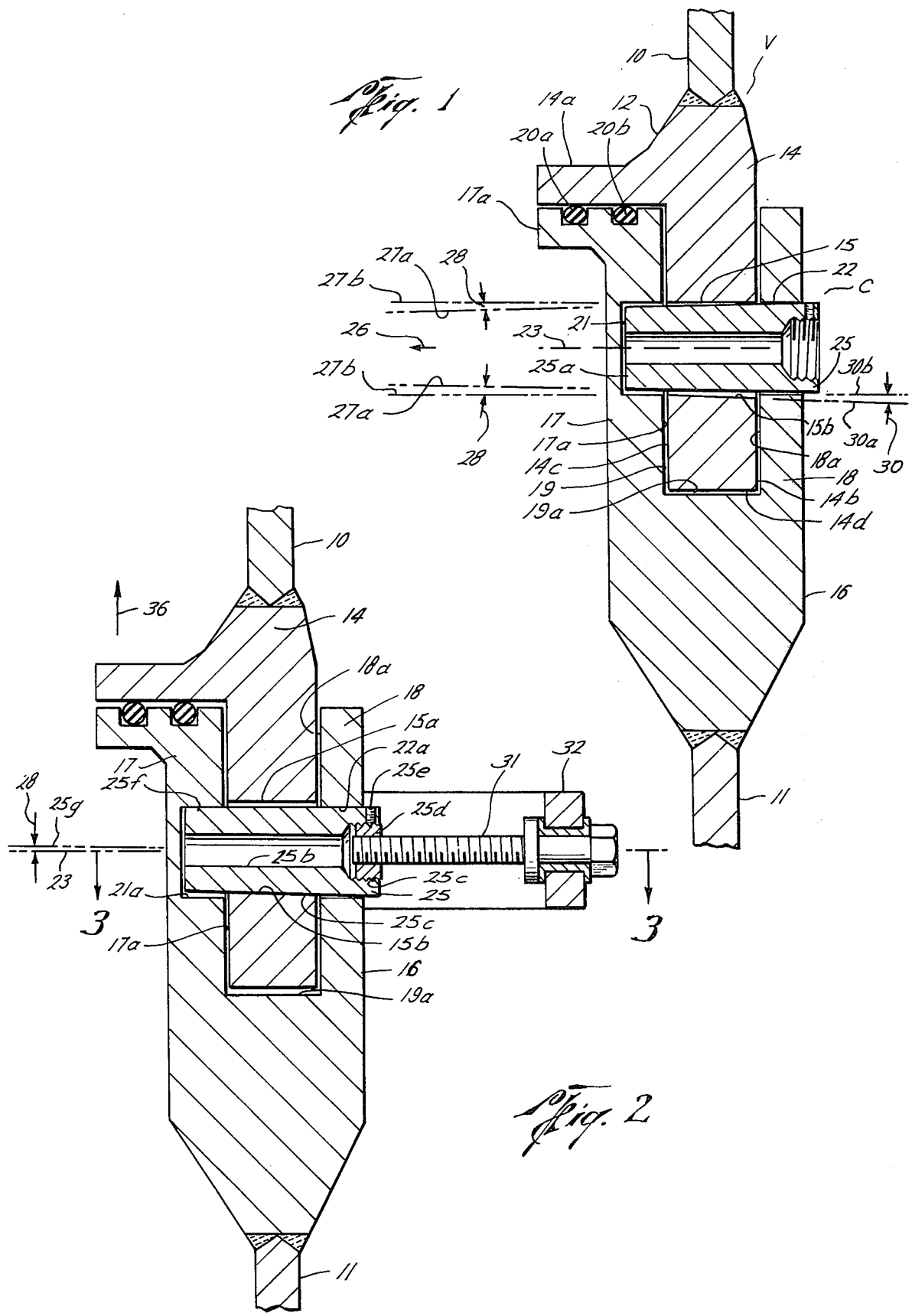

VESSEL CONNECTOR

BACKGROUND OF THE INVENTION

The field of this invention is vessel connectors.

Pin-type vessel closure connectors are known in the art. For example, U.S. Pat. No. 3,780,901 of this inventor discloses a pin-type vessel closure connector for connecting a vessel head or closure to a vessel shell or cylinder. The connector includes an annular yoke formed of double concentric rings separated by an annular recess. The annular yoke is attached to either the vessel head or the vessel shell. A single annular connector ring or finger is mounted on the other vessel section for insertion into the annular recess between the double connector rings. A plurality of pins are insertable into radially aligned openings in the connector rings for the purpose of releasably connecting the vessel head and vessel shell together.

In U.S. Pat. No. 3,372,828, wherein the present inventor is a co-inventor, it is noted that tapered pins have certain advantages over straight cylindrical pins when used as vessel connectors. For example, tapered pins are more easily inserted into the aligned openings since the forward, smaller end of the tapered pin acts as a wedge to finally align the openings between the vessel sections as the pin is inserted. Tapered pins are also easier to remove. However, time and expense are necessary to accurately machine the exact, radially aligned, tapered openings in the double connector rings and the single connector ring for receiving the tapered pin.

Another difficulty with pin-type connectors is found in actual field installation of the single connector ring into the annular recess between the double connector rings. Although the circumference of the single connector ring is predesigned to properly and easily fit into the annular recess between the double connector rings, manufacturing tolerances and field handling may cause a discrepancy in the circumference of the single connector ring which would cause problems with fitting the single connector ring into the annular recess between the double connector rings. Also, installation of the vessel section containing or having the double connector rings, which generally includes the steps of mounting the vessel section in concrete and welding it in place, may cause some variation in the circumference or roundness of the double connector rings and the annular recess therebetween. For these reasons, it is necessary to somehow compensate for changes in the circumference or roundness of either the single connector ring or the double connector rings. One possible solution is to provide for a generous clearance between the single connector ring when positioned in the annular recess between the double connector rings. However, this clearance allows for greater relative movement, during temperature expansion and contraction, between the single connector ring and double connector rings, thereby enhancing the "racheting" effect which tends to push the pins out of position.

SUMMARY OF THE INVENTION

A new and improved vessel structure is provided in the preferred embodiment of this invention for releasably joining together first and second vessel sections utilizing the advantages of tapered pin construction without the disadvantage of having to provide fully tapered openings in the connector rings joining the vessel sections. Generally, the vessel structure includes a first vessel section having an annular end portion formed of double concentric connector rings separated by an annular recess. A second vessel section includes an end portion having a single connector ring for insertion into the annular recess between the spaced double connector rings. The connector rings and thus the first and second vessel sections are releasably joined by a plurality of new and improved pin-type connectors which are circumferentially spaced about the joined connector rings.

Each of the new and improved pin-type connectors includes the following elements. Radially aligned openings are provided in the spaced, double connector rings in order to receive a tapered pin. The single connector ring also has an opening therein which is substantially alignable with the openings in the spaced, double connector rings whereby the pin may be inserted through all three openings in order to releasably join the vessel sections together. The single connector ring opening includes means for allowing the tapered pin to pivot into full bearing engagement with the double ring openings with the single ring opening also being in full bearing engagement with the pin under load conditions. This means for utilizing tapered pins includes the providing of the single connector ring opening with a tapered or inclined portion for fully engaging the tapered pin under load conditions. The tapered portion of the single connector ring is inclined in a direction opposite from the taper or incline of the tapered pin; and in the preferred embodiment, the angle of incline of the tapered portion of the single connector ring opening is substantially equal to twice the angle of the taper of the pin as measured between the outside surface of the pin and the longitudinal axis thereof.

In another related embodiment of this invention, a positioning means is mounted with the single connector ring for positioning the single connector ring uniformly within the annular recess formed by the spaced, double connector rings. The positioning means includes a plurality of circumferentially spaced openings positioned circumferentially within the connector ring, each opening having mounted therein a radially adjustable spacing element for substantially engaging the inner and outer walls of the annular recess between the double connector rings for compensating for undesirable changes in circumference or roundness of either the single or double connector rings.

BRIEF DESCRIPTION OF THE DRAWINGS

FIG. 1 is a side view in section of the new and improved pin-type connector of the preferred embodiment of this invention in the unloaded position;

FIG. 2 is a side view similar to FIG. 1 illustrating the pin-type connector of the preferred embodiment of this invention in a loaded position;

Figure 3:
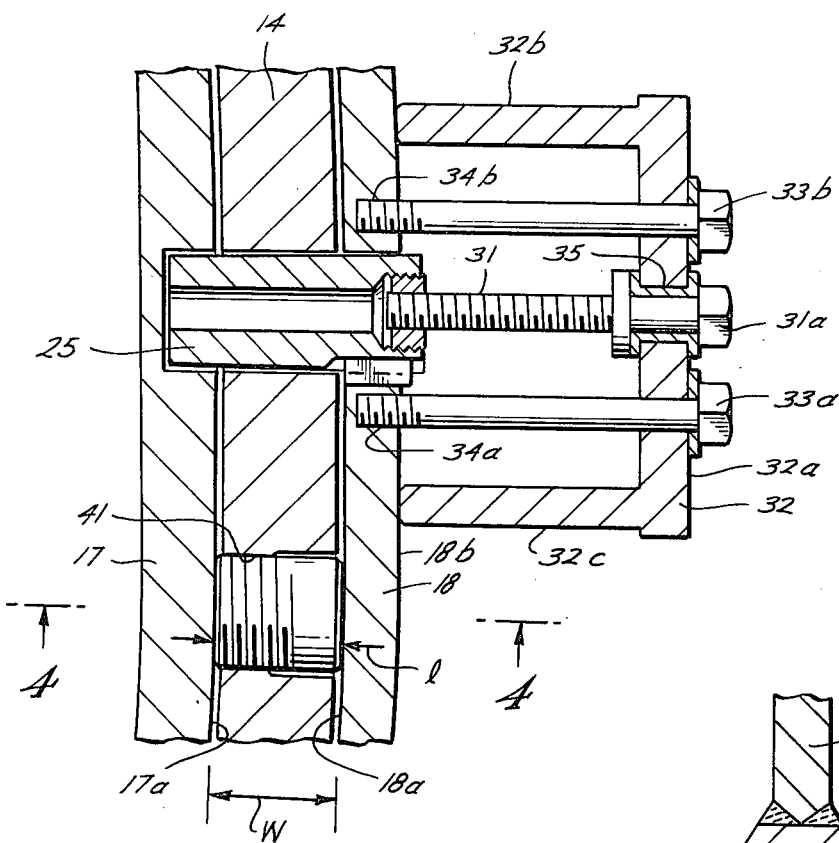
FIG. 3 is a sectional view taken along line 3—3 of FIG. 2 illustrating the relative position of the new and improved pin-type connector and the spacing means of a further embodiment of this invention.

DESCRIPTION OF THE PREFERRED EMBODIMENT referring to the drawings, the letter V generally designates a vessel which includes a first section 10 which is releasably connected to a second section 11 by a pin-type connector C of the preferred embodiment of this invention. The first section 10 may be the vessel head or top of the vessel V and the second vessel section 11 may be the vessel body or shell. However, it should be understood that the invention herein may be utilized even though the roles of the first and second vessel sections may be reversed.

The first vessel section 10 includes an annular end portion 12 which is welded or otherwise attached to the remainder of the first vessel section. The annular end portion 12 includes a single connector ring 14 having integrally formed therewith an internally extending rim portion 14a. The single connector ring 14 is further defined as having an outside wall portion 14b and an inside wall portion 14c joined by a bottom rim 14d. An opening generally designated by the number 15 is illustrated in FIG. 1. The opening 15 is representative of a plurality of circumferentially spaced openings of the same structure positioned about the annular end portion 12 of the first vessel section 10.

The second vessel section 11 includes an annular end portion or yoke 16 which is formed by double concentric connector rings 17 and 18 separated by annular recess 19. The inner connector ring 17 has integrally formed therewith an internal rim portion 17a which is adapted to face the internal rim portion 14a of the single connector ring 14. Concentrically positioned O-rings 20a and 20b are positioned in grooves in the upper face of the internal rim portion 17a in order to sealably engage the internal rim portion 14a when the first and second sections are in the closed, loaded position.

The inner connector ring 14 includes a circular opening, hole or recess 21 in inner connector ring wall 17a. The outer connector ring 18 has opening 22 machined therein in alignment with the opening or circular recess 21 in the inner connector ring wall 17a. It should be understood that by alignment it is meant that the openings 21 and 22 have a common axis or center point designated as 23 in the drawings. The annular recess 19 between the inner and outer connector rings 17 and 18, respectively, is formed by the inner connector ring wall 17a and outer connector ring interior wall 18a and bottom wall 19a.

The plurality of pin-type connectors C spaced circumferentially about the connector rings 14, 17 and 18 7 include the openings 15, 21 and 22. The opening 15 in the single connector ring is alignable with each set of openings 21 and 22 in the inner and outer connector rings 17 and 18, respectively. Therefore, the opening 15 has the same center point or axis 23 as does the openings 21 and 22. When the openings 15, 21 and 22 are substantially aligned, a tapered pin 25 is inserted therein in order to releasably join the first vessel section 10 and the second vessel section 11 together. The tapered pin 25 is tapered inwardly in the direction of arrow 26 towards the center (not shown) of the vessel V. The angle of taper is measured between lines 27a, which are extensions of the surface of the pin 25, and lines 27b which are parallel to the center line, also designated by the number 23, of the pin 25. The lines 27a and 27b define the angle of pin taper which is designated by the number 28. Tapered pins are desirable to use because they are inserted more easily into the openings 15, 21 and 22 due to the fact that the smaller end portion 25a thereof is inserted first into each of the openings 22, 15 and 21, respectively. Further, the tapered pins have other advantages including the fact that they are more easily removed than straight pins. Insofar as known, tapered pins have always been placed in entirely tapered holes in order to insure a close fit and provide full engagement between the various surfaces during load conditions such as illustrated in FIG. 2. Therefore, the manufacturer has been required to taper each of the openings, 21, 15 and 22 and align them in order to receive a tapered pin such as 25. The necessity of having to taper all three openings 21, 15 and 22 has been found to be undesirably expensive.

In order to overcome this undue expense, the pin-type connector C of the preferred embodiment of this invention includes means for allowing the tapered pin 25 to pivot from the unloaded position of FIG. 1 to a loaded position in upper, full bearing engagement with the double ring openings 21 and 22 while allowing the single ring opening 15 to be in full bearing engagement with the pin 25 without having to taper all three openings 21, 22 and 15.

Even though the pin 25 is tapered, the opening 22a in outer ring 18 is not tapered. The walls 22a of outer ring opening 22 are parallel to the centerline 23 of the opening itself. Further, cylindrical wall portion 21a of the circular opening or recess 21 is also parallel to the centerline 23 thereof. Stated with respect to another reference point, the opening walls 22a and 21a are parallel to each other and to the radius or centerline 23 of the vessel section 11.

However, single connector ring opening 15 has a different structure. The opening 15 may be defined as including an upper portion 15a and a lower portion 15b. The upper portion 15a is formed by a semi-cylindrical wall portion parallel to the walls 22a and 21a of the other openings. However, the lower opening portion 15b has a wall which is tapered or inclined in the opposite direction from the taper of the pin 25. The amount of the taper of wall portion 15b is measured by angle 30 in FIG. 1. Angle 30 is defined by an extension of the plane of the wall portion 15b as shown by line 30a as compared to an extension of opening wall portion 22a which is shown by line 30b. The angle defined by lines 30a and 30b is called angle 30 herein. Angle 30 is twice the size of the taper angles 28 of the pin 25. In this manner, the advantages of a tapered pin such as 25 may be utilized in the pin-type connector C without the expense of having to fully taper each of the openings 21, 22 and 15.

The pin 25 has a hollow bore 25b therethrough which is countersunk by a threaded recess 25c. A nut 25d is threadedly mounted within the countersunk portion 25c and is held in position by a set screw 25e. The nut 25d has a threaded opening receiving a lock shaft 31. The lock shaft 31 is mounted for rotation within a U-shaped bracket 32 illustrated in FIGS. 2 and 3. The U-shaped bracket 32 includes a back portion 32a and leg portions 32b and 32c which are adapted to engage outer connector ring exterior wall 18b. The bracket 32 is mounted about the pin 25 by bolts 33a and 33b which extend through the bracket back 32a and are threadedly connected into suitable openings 34a and 34b in the outer connector ring exterior wall 18b. The lock shaft 31 is mounted for rotation in the bracket back 32a by a sleeve 35. A hexagonal head 31a extends out of the bracket back 32a for receiving a wrench or other tool to rotate the lock shaft 31.

In operation and use of the new and improved pin-type connectors described herein, the bracket 32 is actually fitted for mounting onto the outer connector ring exterior wall 18b during the manufacture of the vessel section 11. However, the bracket 32 is not actually placed onto the outer connector ring 18 until the vessel V is permanently installed.

Generally, the vessel section 11 is the shell and it is permanently installed in a concrete structure and welded into place. When it is time to place the first section, the head 10 onto the vessel for operation, the entire head 10 is lowered onto the vessel shell 11 and the connector ring 14 is inserted into the annular recess 19 between the double connector rings 17 and 18. The plurality of holes 15 are then aligned with the corresponding plurality of holes or openings 21 and 22 in the inner and outer connector rings 17 and 18, respectively. The pin 25 is then partially inserted and the bracket 32 is mounted in position with the lock screw 31 threadedly inserted into the pin nut 25d. The lock shaft 31 is rotated to actually insert the pin into the at least partially aligned openings 15 and 21 and 22. Rotation of the lock shaft 31 in the proper direction will insert the tapered pin 25 into the openings 22, 15 and 21. Each of the pin-type connectors C will then appear as shown in FIG. 1 with the vessel V in the unloaded position. Whenever the vessel V is loaded, that is whenever internal pressure is created, the first vessel section or head pin is pushed upwardly in the direction of arrow 36 thereby moving the single connector ring 14 in the same direction. This upward movement in the direction of arrow 36 of the single connector ring 14 causes a pivoting of the pin 25 such that upper portions of 25f the pin 25 are moved into full bearing engagement against upper wall portions of the openings 21 and 22. Further, the upper movement of the single connector ring 14 moves the lower tapered opening portion 15b into full bearing engagement with the now pivoted lower pin surface of the tapered pin 25. Thus, in the loaded position, the upper portions of the opening walls 22a and 21a are fully engaged and in contact with corresponding upper portions on the tapered pin surface 25f, due to the pivoted movement of the pin and in particular of the end portion 25 upwardly in the direction of arrow 36. The pin 25 is pivoted upwardly such that the upper portion of tapered pin surface 25f is parallel to the radius or axis 23 and pin axis 25g (FIG. 2) is pivoted to the angle 28 (equal to the angle of pin taper) with respect to opening axis 23. This pivotal movement of the tapered pin 25 moves the tapered pin surface portion 25c, above the tapered portion 15b of single connector ring opening 15, upwardly to a taper angle twice that of angle 28. Therefore, the taper angle 30 of the lower inclined or tapered opening portion 15b is thus moved into full contact and bearing engagement with the correspondingly pivoted portion 25c. In this manner, each of the load bearing surfaces of the pin 25 are fully engaged by corresponding surfaces on the openings thereby distributing the stress as much as possible. This arrangement gives all the benefits of the utilization of tapered pins while allowing for full bearing engagement of the opening surfaces on the tapered pins thereby distributing the stress as much as possible, without having to resort to the expensive task of tapering each of the openings 21, 22 and 15.

Another problem with the actual installation of the vessel V sometimes occurs with respect to changes in the circumference of the single connector ring 14 or in the circumference of one or both of the double connector rings 17 and 18. Changes in the design circumference of rings 14 or 17 and 18 may be caused by manufacturing tolerance errors or by differences in environment between the manufacturing facility and the actual field installation area, where, as previously mentioned, the vessel shell 11 may be welded and concreted into place. This is particularly true when the vessel V is used as a nuclear vessel in power plants and the like. Also, it is possible that the single connector ring 14 may become out of round due to handling or for other reasons.

Figure 4:
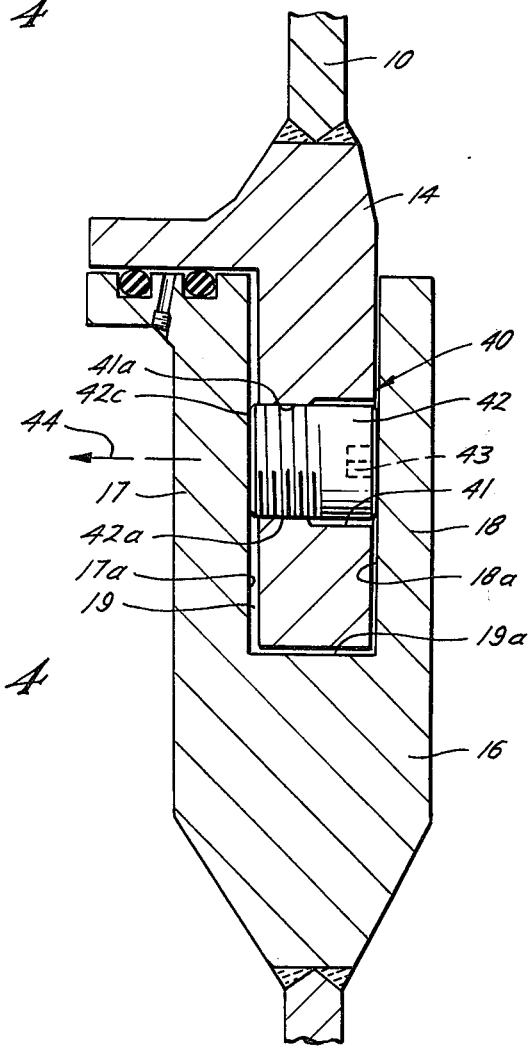
FIG. 4 is a sectional view taken along 4—4 of FIG. 3 further illustrating the spacer means.

In any event, when the circumference of the single connector ring 14 or of the annular recess 19 changes, or when the single connector ring 14 becomes out of round at some point, it is more difficult to insert the single connector ring 14 into the recess 19. And, after insertion, the changes in the design circumferences of the single connector ring 14 may cause more of the racheting effect previously mentioned thereby making it more difficult to keep the pins 25 in place during expansion and contraction of the vessel V under operating conditions. In order to overcome this problem, spacer means generally designated by the number 40 are illustrated in FIGS. 3 and 4. The spacer means are mounted in single connector ring 14 for substantially engaging inner recess wall 17a and outer recess wall 18a and securing the position of ring 14 in recess 19 in order to compensate for any type of undesirable change from design circumference which has taken place in the single connector ring 14 or the recess 19 formed between the inner and outer connector rings 17 and 18. The spacer means 40 includes a plurality of circumferentially spaced openings 41 which are positioned between the circumferentially spaced pin-type connectors C. The openings 41 include a threaded portion 41a. In each opening, a spacer element 42 is threadably mounted. In the preferred embodiment of this invention, the spacer element 42 is a cylindrical plug having includes a threaded portion 42a for threadably engaging the threaded portion 41a of each opening 41. A recess 43 may be machined in each spacer element 42 for receiving a tool for rotating same. The spacer elements 42 are generally made of a metal different from the metals of the single connector ring 14 and the double connector rings 17 and 18. For example, it is within the scope of this invention to utilize spacer elements of brass or bronze when the rings are either all stainless steel or all carbon steel. One of the reasons for utilizing brass or bronze spacing elements is to prevent galling of the surfaces of the spacer element against the ring surfaces such as 17a during use.

The length $l$ of the spacer element 42 is substantially equal to the width $w$ of the recess 19 so that the ring 14 is held against relative movement with respect to the double rings 17 and 18.

In operation and use of the spacer means, the circumference of the single connector ring 14 may be compared against the design circumference and the spacer elements 42 may be rotated to compensate for any changes in the circumference. For example, if the circumference of the single connector ring 14 has been reduced, as compared with design circumference, the spacer elements 42 may be rotated radially inwardly in the direction of arrow 44 in order to provide a radially inwardly disposed spacing portion such as 42c in FIG. 4. This spacing portion 42c will engage the recess surface 17a and maintain the connector ring 14 in a desired position within the annular recess 19 in spite of the contraction in circumference of the connector ring. Conversely, should the outer wall portion 18a of the outer connector ring 18 contract, the spacer elements 42 may be rotated in the opposite direction to engage the recess surface 18a in order to position and hold the single connector ring 14 in the desired position uniformly within the recess 19.

The foregoing disclosure and description of the invention are illustrative and explanatory thereof, and various changes in the size, shape and materials as well as in the details of the illustrated construction may be made without departing from the spirit of the invention.

I claim:

1. A vessel structure including a first vessel section having an annular end portion formed of spaced, double concentric connector rings separated by an annular recess and a second vessel section including an end portion having a single connector ring for insertion into said recess between said double connector rings, said single and double connector rings being releasably joined by a plurality of improved pin-type connectors circumferentially spaced about said connector rings, each of said improved pin-type connectors including the following elements:

said spaced, double connector rings having aligned openings therein;

said single connector ring having an opening therein which is substantially alignable with said spaced double ring openings;

a tapered pin inserted into said double and single ring alignable openings;

said single connector ring opening including means for allowing said tapered pin to pivot into full bearing engagement with said double ring openings with said single ring opening being in full bearing engagement with said pin under loaded conditions; and said opening for said single connector ring including a tapered portion and an untapered portion, said tapered portion bearing directly against said tapered pin with said vessel under load conditions such that said tapered pin is pivoted into full bearing engagement with said double ring openings.

2. The structure set forth in claim 1, including:

said tapered portion of said single connector ring opening being tapered with respect to the walls of said double connector ring openings in a direction of incline opposite to the taper of said tapered pin.

3. The structure set forth in claim 1, including:

said single connector ring opening being sufficiently tapered at said one portion thereof to fully engage a part of one side of said tapered pin in said opening under load conditions.

4. The structure set forth in claim 2, wherein:

said pin is tapered to a pin angle measured between the outside surface of said pin and the longitudinal axis thereof; and said tapered portion of said single ring opening is tapered to an angle twice that of said pin angle.

5. The structure set forth in claim 1, including:

said double connector ring openings being aligned and having circular walls which are parallel to each other;

said untapered portion of said single connector ring opening being parallel to said circular walls of said double rings; and said tapered portion of said single connector ring opening being inclined with respect to said tapered portion thereof.

6. A vessel structure including a first vessel section having an annular end portion formed of spaced, double concentric connector rings separated by an annular recess and a second vessel section including an end portion having a single connector ring for insertion into said recess between said double connector rings, said single and double connector rings being releasably joined by a plurality of improved pin-type connectors circumferentially spaced about said connector rings, each of said improved pin-type connectors including the following elements:

said spaced, double connector rings having aligned openings therein;

said single connector ring having an opening therein which is substantially alignable with said spaced double ring openings;

a tapered pin inserted into said double and single ring alignable openings;

said single connector ring opening including means for allowing said tapered pin to pivot into full bearing engagement with said double ring openings with said single ring opening being in full bearing engagement with said pin under loaded conditions; and positioning means mounted with said single connector ring for positioning said single connector ring uniformly within said annular recess.

7. The structure set forth in claim 6, including:

a plurality of circumferentially spaced openings in said single connector ring; and radially adjustable spacing elements mounted in said openings.

8. The structure set forth in claim 7, including:

said spacing elements being positioned between said circumferentially spaced improved pin-type connectors.

9. A vessel structure including:

a first vessel section having an annular end portion formed of double concentric rings separated by an annular recess;

a second vessel section having an annular end portion formed of a single connector ring insertable into said annular recess between said double concentric rings;

positioning means mounted with said single connector ring for engaging said double concentric rings at circumferentially spaced points for positioning said single connector ring uniformly within said annular recess; and a plurality of pin connectors extending substantially radially inwardly through sets of openings in said double concentric rings and said single connector ring.

10. The structure set forth in claim 9, wherein said positioning means includes:

means for compensating for changes in the design circumference of said single connector ring to provide for uniform spacing of said single connector within said annular recess.

11. A vessel structure including first and second vessel sections having annular end portions joined by a plurality of pin-type connectors, including:

said first vessel section having an annular end portion formed of double concentric rings separated by an annular recess;

said second vessel section having an annular end portion formed of a single connector ring insertable into said annular recess between said double concentric rings;

positioning means mounted with said single connector ring for positioning said single connector ring uniformly within said annular recess; and said positioning means including a plurality of circumferentially spaced openings in said single connector ring and radially adjustable spacing elements mounted in said openings.

12. The structure set forth in claim 11, including:

said openings in said single connector ring being threaded; and said spacer element for each opening being threaded for mounting in said opening, the radial position of said spacer element being adjustable by rotation of said spacer element.

13. The structure set forth in claim 11, including:

said spacer elements being a different material than said connector rings.

14. The structure set forth in claim 11, including:

said spacer element having a length substantially equal to the width of said annular recess such that said single connector ring is held against relative movement with respect to said double connector rings.

15. The structure set forth in claim 9, wherein said positioning means includes:

means for preventing relative movement of said single connector ring with respect to said double connector rings.

* * * * *